United States Patent [19]
Kanda et al.

[11] Patent Number: 5,607,137
[45] Date of Patent: Mar. 4, 1997

[54] ELECTRICALLY OPERATED FLOW CONTROL VALVE

[75] Inventors: Robert J. Kanda, Lake Orion; Michael A. LaMothe, Commerce, both of Mich.

[73] Assignee: Eaton Corporation, Cleveland, Ohio

[21] Appl. No.: 525,258

[22] Filed: Sep. 8, 1995

[51] Int. Cl.⁶ .................................................. F16K 31/06
[52] U.S. Cl. ..................................... 251/129.07; 251/282
[58] Field of Search ........................ 251/129.07, 129.08, 251/282, 129.15

[56] References Cited

U.S. PATENT DOCUMENTS

| | | | |
|---|---|---|---|
| 2,987,293 | 6/1961 | Knudson | 251/129.07 |
| 4,390,158 | 6/1983 | Lang | 251/282 X |
| 4,643,227 | 2/1987 | Suzuki et al. | 251/129.07 X |
| 4,852,853 | 8/1989 | Toshio et al. | 251/129.07 |
| 5,299,600 | 4/1994 | Aronovich | 251/129.08 X |

*Primary Examiner*—Kevin Lee
*Attorney, Agent, or Firm*—Roger A. Johnston

[57] ABSTRACT

A balanced pressure spool valve has a collector groove formed on the periphery of the valving spool adjacent the valving land, with an annular armature attached to the spool. The collector groove has a radially extending bleed hole which communicates with the axially extending pressure equalization bore in the spool. A solenoid coil upon increased current flow electromagnetically acts on the armature to progressively move the spool and the valving land closes outlet ports formed in the valving bore in which the spool is received. The collector groove intersects the outlet ports to provide bleed flow as the ports are closed by the valving land, thus attenuating the effect of any pressure force imbalance created by the increased flow velocity as the outlet ports are closed.

9 Claims, 5 Drawing Sheets

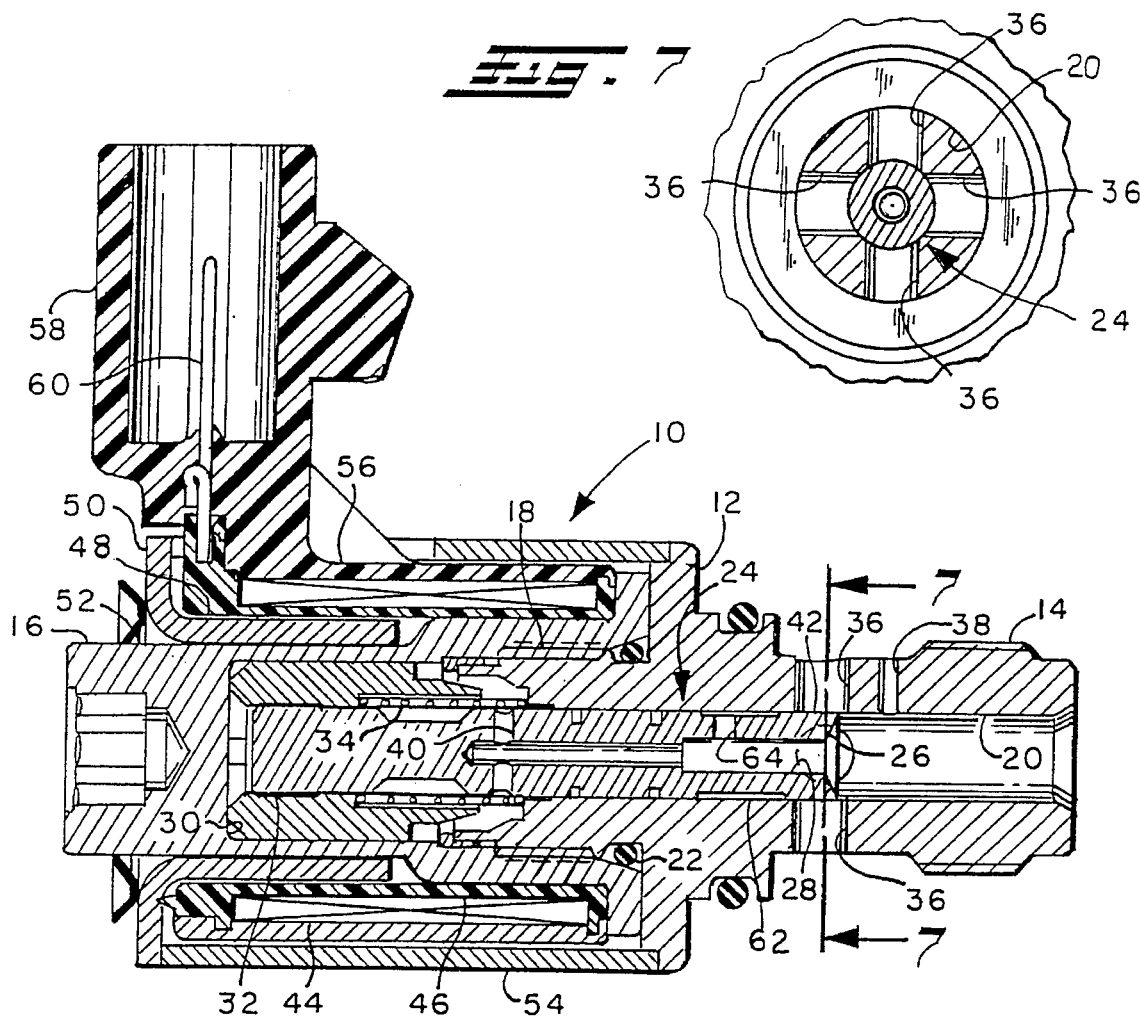
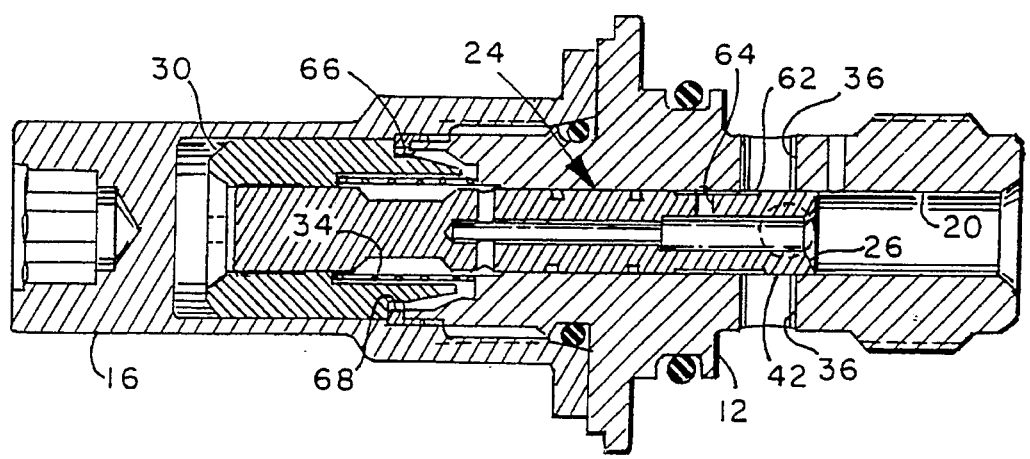

5,607,137

ELECTRICALLY OPERATED FLOW CONTROL VALVE

BACKGROUND OF THE INVENTION

The present invention relates to electrically operated flow control valves of the type having a pressure balanced spool moveable in a bore for controlling flow from an inlet to an outlet ported along the bore. Such valves are employed where it is desired to provide a regulated flow to the outlet port in the face of a widely varying inlet pressure to the valve. Such requirements are typical of those found in automotive power steering applications where it is desired to electrically control the flow of hydraulic fluid to the power steering gear from an engine driven pump, the output of which varies with the engine speed.

Heretofore, automotive power steering systems employing electrically operated valves for controlling fluid flow to the steering gear have utilized electromagnetic operators such as a solenoid coil with an armature attached to a pressure balanced spool for controlling flow to outlet ports in a bore in which the spool is closely interfitted. In such electrically operated pressure balanced spool valves, it has been found that as the solenoid control signal current is increased to electromagnetically move the armature and spool to progressively close the flow from the inlet to the outlet ports in the bore, the increase in flow velocity through the outlet ports as the ports are progressively closed causes a significant pressure reduction at the inlet end of the spool and an accompanying force imbalance on the ends of the spool. Thus, the spool is accelerated toward the closed position by the pressure force imbalance causing a rapid fluctuation in the flow through the valve for a given electrical control signal to the solenoid. This rapid closing of the valve due to the dynamic pressure drop in the flow through the outlet ports has rendered the known valves difficult to utilize in certain applications where a relatively constant regulated flow is required, such as automotive power steering applications and has resulted in undesired response of the controlled system at certain valve positions.

Referring to FIG. 5 which is illustrative of measured performance of a prior art valve, it will be seen that at relative low back-pressures, i.e., 50 psig at the load, the flow in the prior art valves is quite erratic over the range of fluid supply pump speeds utilized. It will be further seen from FIG. 5, that at higher back pressures the flow in the prior art valves is somewhat stabilized at the higher pump speeds, but undergoes drastic excursions at the lower pump speeds.

With reference to FIG. 5, the sudden change in flow rate through the valve for various levels of back-pressure due to the load in the system as experienced by the prior art valve is shown for the situation of the valve inlet connected to a variable speed pump supply; and, the effect is dramatically evident in the pump shaft speed range of 2,000 to 5000 rpm.

Referring to FIG. 6, which is also illustrative of measured performance of a prior art valve, it will be seen that even with no current (0 milliaperes) to the valve coil of a prior art device and with the valve in the fully open condition, at certain pump speeds (supply pressures), the flow is substantially reduced by pressure imbalance on the spool. Referring to FIG. 6, it will be further seen that, at various levels of valve coil energization, the prior art valve produces flow which is quite erratic at low and high supply pump speeds.

Accordingly, it has been desired to find a way or means of electrically controlling flow through a spool valve in response to widely varying inlet pressure conditions, particularly those resulting from a variable speed pump supply to the valve inlet and to provide a regulated flow in a manner that results in a valve having relatively low manufacturing costs and reliable operation of the valve.

SUMMARY OF THE INVENTION

It is object of the present invention to provide an electrically operated balanced spool valve for regulating flow from a varying source of pressure at the valve inlet.

It is a further object of the present invention to provide an electromagnetically operated flow regulating valve having a spool moved in a valving bore by the armature for regulating flow to outlet ports in the bore from an inlet communicating with the end of the spool.

It is a further object of the present invention to provide an electromagnetically operated pressure balanced spool valve for regulating flow to outlet ports from a varying inlet supply pressure in which means are provided on the spool for bleeding the inlet flow to the outlet ports to compensate for the decrease in dynamic flow pressure as the spool progressively covers the outlet ports.

It is a further object of the present invention to provide an electromagnetically operated pressure balanced spool valve having a bleed port to the pressure equalizing passage in the spool for attenuating the effect of the force imbalance on the spool due to the drop in dynamic pressure of the flow to the outlet port as the spool progressively closes the outlet ports.

The present invention employs a solenoid coil electromagnetically moving an armature attached to the end of a spool valve disposed in a valving bore having the inlet at the end of the bore with the outlet ports provided along the bore. As the coil is energized by a control signal, the spool is moved to progressively cover and uncover the outlet ports for regulating flow from the inlet to the outlet ports. As the spool closes the ports a predetermined amount, a bleed passage communicates the pressure equalizing passage through the spool to the outlet ports to attenuate the effect of the drop in dynamic pressure caused by the increased velocity of the flow through the ports as the ports are closed by the spool.

BRIEF DESCRIPTION OF THE DRAWINGS

FIG. 1 is a cross-section of the valve assembly of the present invention shown in the fully open position;

FIG. 2 is a portion of a view similar to FIG. 1 showing the valve in the fully closed position;

FIG. 7 is a section view taken along section indication lines 7—7 in FIG. 1.

DETAILED DESCRIPTION

Figure 3:
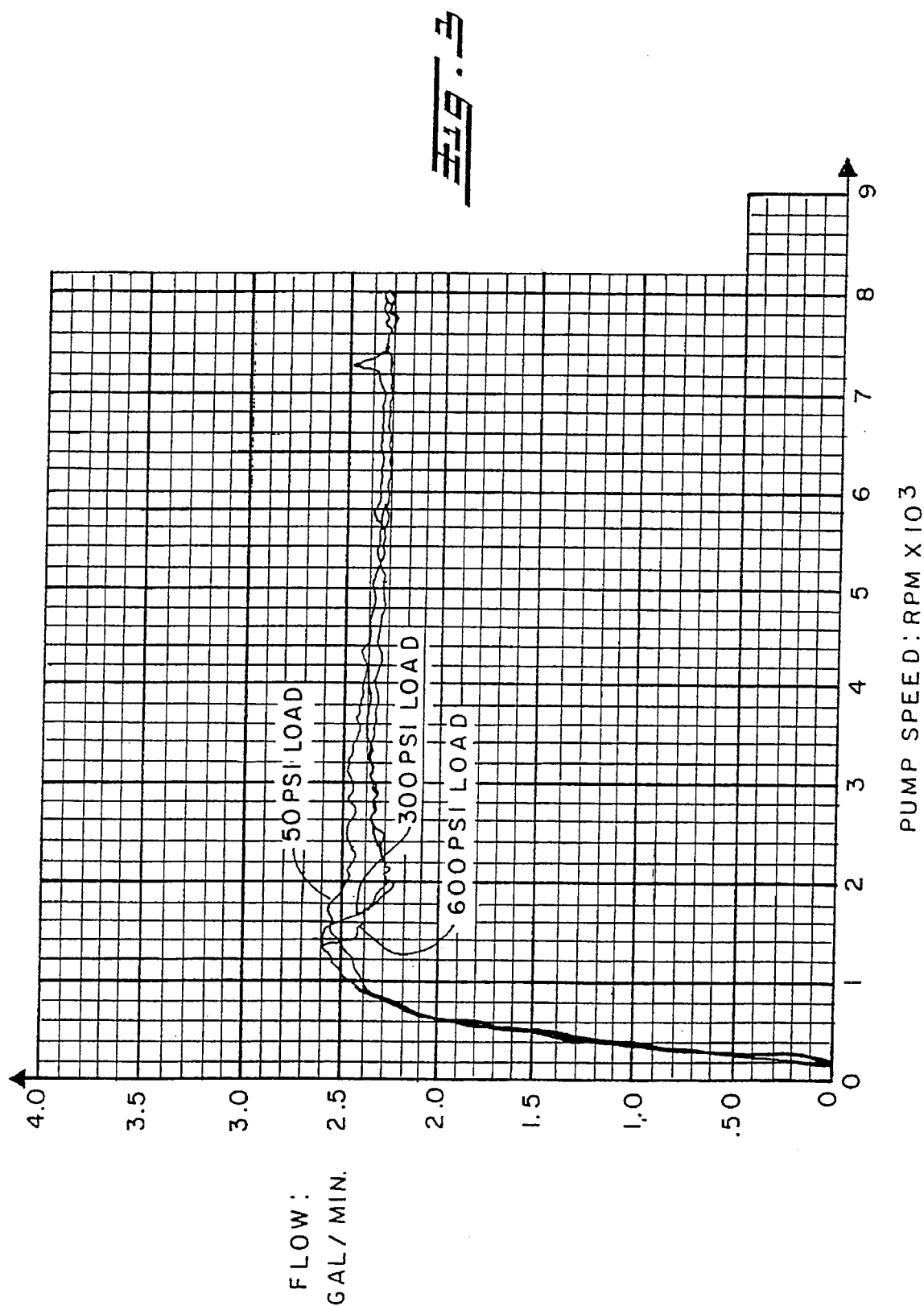
FIG. 3 is a graphical plot of flow versus supply pump speed for the invention valve for different levels of load back pressure.

Referring to FIG. 1, the valve assembly is indicated generally at 10 and includes housing means having a body 12 with an inlet fitting 14 thereon and a tube member 16 threadedly attached to the base by suitable threaded connection indicated by reference numeral 18. Tube 16 is sealed over the threaded connection 18 by a suitable seal ring 22. Inlet fitting 14 has an inlet passage or bore 20 formed therein which is adapted for connection to a source of variable pressure hydraulic fluid (not shown), as for example, fluid from an engine driven pump.

Body 12 has a valving spool indicated generally at 24 slidably received in bore 20 in precision closely fitting arrangement with one end 26 exposed to the open end of passage 20; and, spool 24 has a pressure equalization passage 28 formed centrally therein and extending axially therethrough. The end of spool 24 opposite or remote from end 26 has an annular ferromagnetic armature 30 attached thereto, by press fitting onto the spool as denoted by reference numeral 32. The armature 30 and spool 24 are biased in a direction away from inlet 20 by a spring 34 having one end engaging a shoulder provided on the armature about the spool and the opposite end engaging the end of the body 12.

Inlet passage 20 is cross-ported by a plurality of and preferably four circumferentially equally spaced outlet ports 36 which are at slightly staggered locations in the axial direction of the body. A minimum flow port 38 is provided between the main outlet ports 36 and the open end of inlet passage 20 for the purpose of providing a minimum flow when the outlet ports 36 are closed.

Spool 24 has the pressure equalization passage 28 ported by the plurality of cross ports 40 formed therein to provide fluid pressure communication from the inlet passage 20 to the region surrounding the opposite end of the spool 24 within the tube 16 via the annular clearance between armature 30 and tube 16. This arrangement permits the pressure forces of the fluid to act on the opposite ends of the spool 24 thus creating axially balanced forces on the spool.

Spool 24 has an annular valving land 42 formed about the end 26 thereof extending for a predetermined axial distance. It will be understood that the land 42 cooperates with the inlet passage 20 to prevent flow about the spool 24 to the ports 36 by virtue of the precision closely fitting sliding engagement between the land 42 and passage 20. The spool is shown in FIG. 1 biased to its fully open position with the end of armature 30 registered against the inside of the closed end of the tube 16 for limiting the stroke of the spool.

An electrical operator in the form of a solenoid coil 44 is formed on a bobbin 46 and is received over the tube 16 and secured thereon by annular pole piece 48 which has an outwardly extending flange 50 which is secured on the tube 16 by a frictionally engaging annular clip 52. The pole piece flange 50 is registered against one end of an outer cylindrical shell or casing 54 which has its opposite end registered on body 12 and which completes the flux loop about the coil. It will be understood that coil 44 has a suitable protective encapsulation of insulating material, preferably molded plastic, denoted by reference numeral 56 and which has integrally formed therewith and extending outwardly therefrom a suitable electrical receptacle 58. Receptacle 58 extends over a pair of electrical terminals, one of which is shown in FIG. 1 and denoted by reference numeral 60 and to which is attached one end of coil 44.

Spool 24 has formed thereon an annular collector groove 62 which has one edge thereof coinciding with the end of valving land 42; and, groove 62 has formed therein a cross hole or bleed passage 64 which communicates the pressure equalization passage 28 with the collector groove 62. The collector groove is located on the spool so as to intersect the outlet ports at a predetermined axial movement of spool 24.

Referring to FIG. 2, armature 30 and spool 24 are shown in the fully closed position in which spool 24 has been moved to the right in passage 20 by sufficient energization of the coil to a position where the end 26 of the spool has closed the ports 36. As the end 26 of the spool 24 is progressively moved from the position shown in FIG. 1 to the position shown in FIG. 2 by increased energization of the coil, the electromagnetic forces acting on armature 30 are sufficient to overcome the bias of spring 34 to cause the armature to move to the position where armature shoulder 66 registers against annular stop ring 68 provided on the end of the body 12.

The width of land 42 in the axial direction is slightly less than the diameter of the ports 36 such that groove 62 intersects one of the outlet ports 36 prior to the end 26 of the spool closing all of the ports 36. Thus, as the ports 36 are progressively reduced in flow area and the flow velocity increases therethrough, the increased velocity causes a resultant drop in dynamic flow pressure which tends to cause a pressure imbalance on the opposite ends of the spool 24. This pressure imbalance is attenuated by flow through bleed passage 64 and outwardly to the passage 36 through groove 62. In the presently preferred practice of the invention bleed hole 64 has a diameter of 0.040 inches (1.016 mm).

A bypass or minimum flow passage is provided in the form of a port 38 formed through inlet fitting 14 to intersect inlet passage 20 for maintaining a minimum or residual flow when the passages 36 are completely closed by spool land 42.

Figure 5:
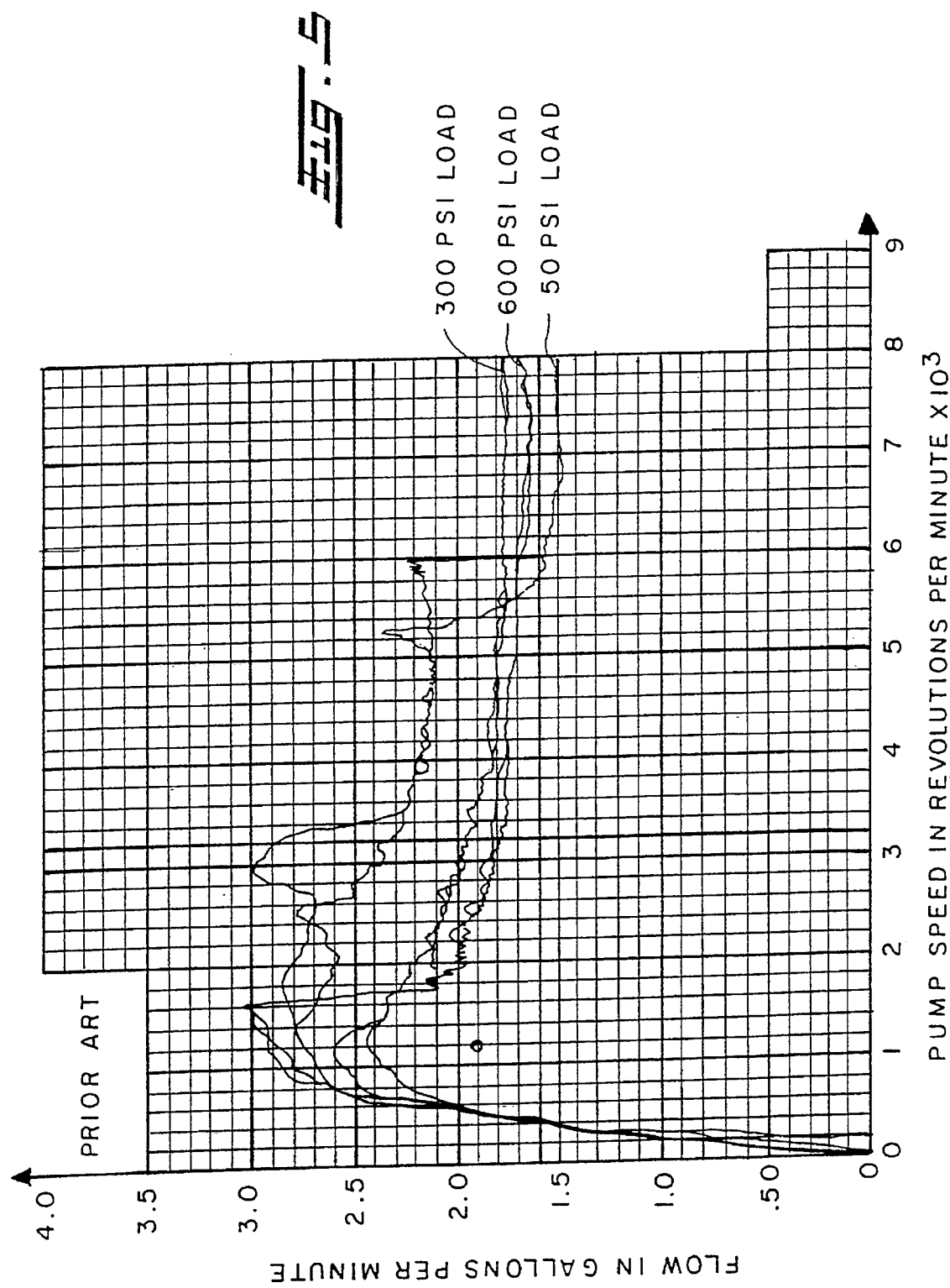
FIG. 5 is a graphical plot of flow versus supply pump speed for different levels of load back pressure for a PRIOR ART valve; and, FIG. 6 is a graphical plot of flow versus supply pump speed for different levels of electrical energization of the valve solenoid coil for a PRIOR ART valve.

Referring to FIG. 3, the effect of the passage 64 and groove 62 are illustrated by the curves denoted for three levels of load back pressure 50, 300 and 600 psi, wherein it is noted that as compared to the prior art performance curves shown in FIG. 5, the flow of the invention valve is generally constant from the midrange of the pump speed up to the maximum speed without the dramatic roll off experienced in the prior art valves. The valves were operated at a pressure drop of 30 psi from inlet to outlet in the testing the results of which are illustrated in FIGS. 3 and 5.

Figure 4:
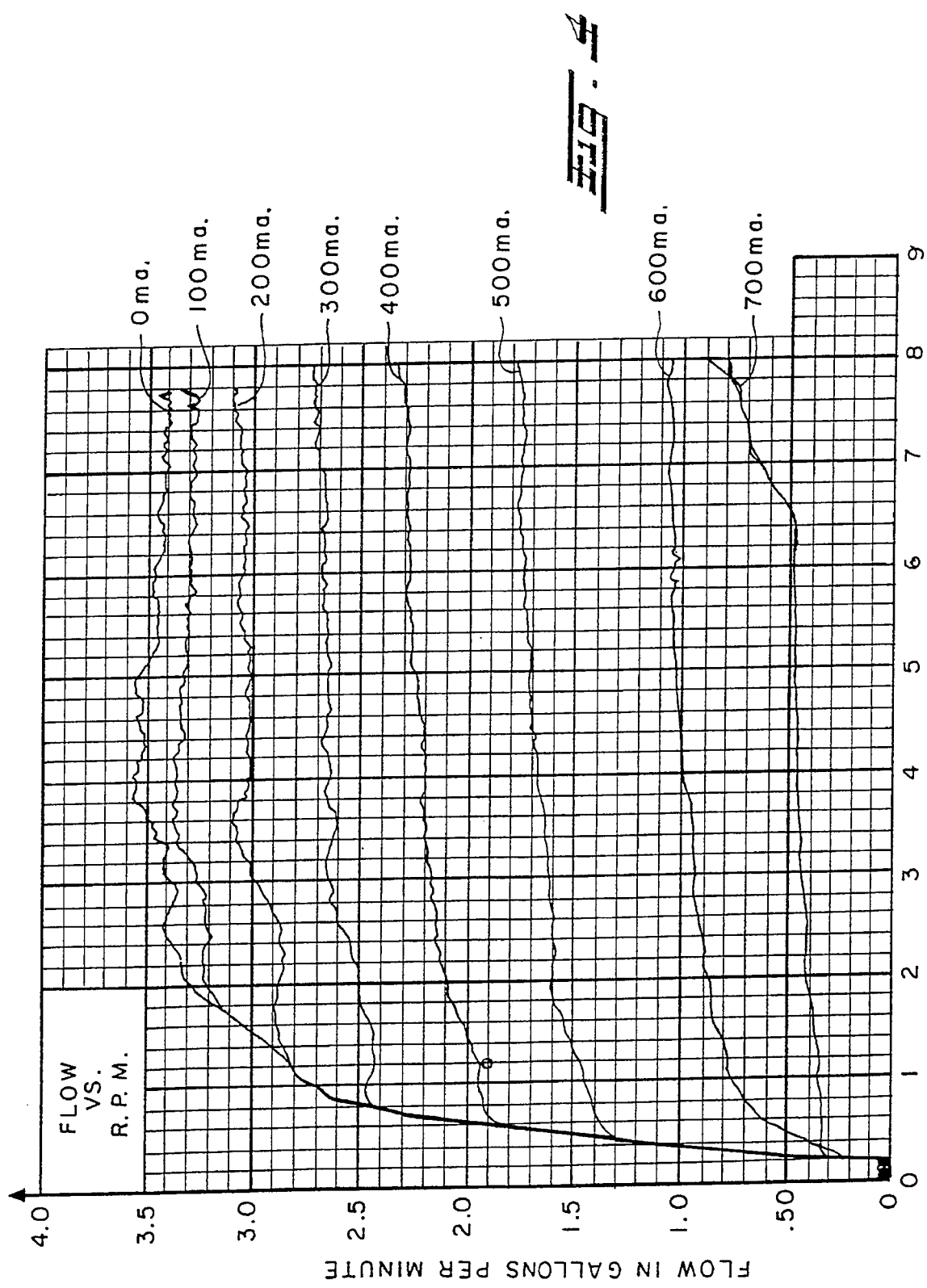
FIG. 4 is a graphical plot of flow through the invention valve versus supply pump speed for various different levels of electrical energization of the coil.
Figure 6:
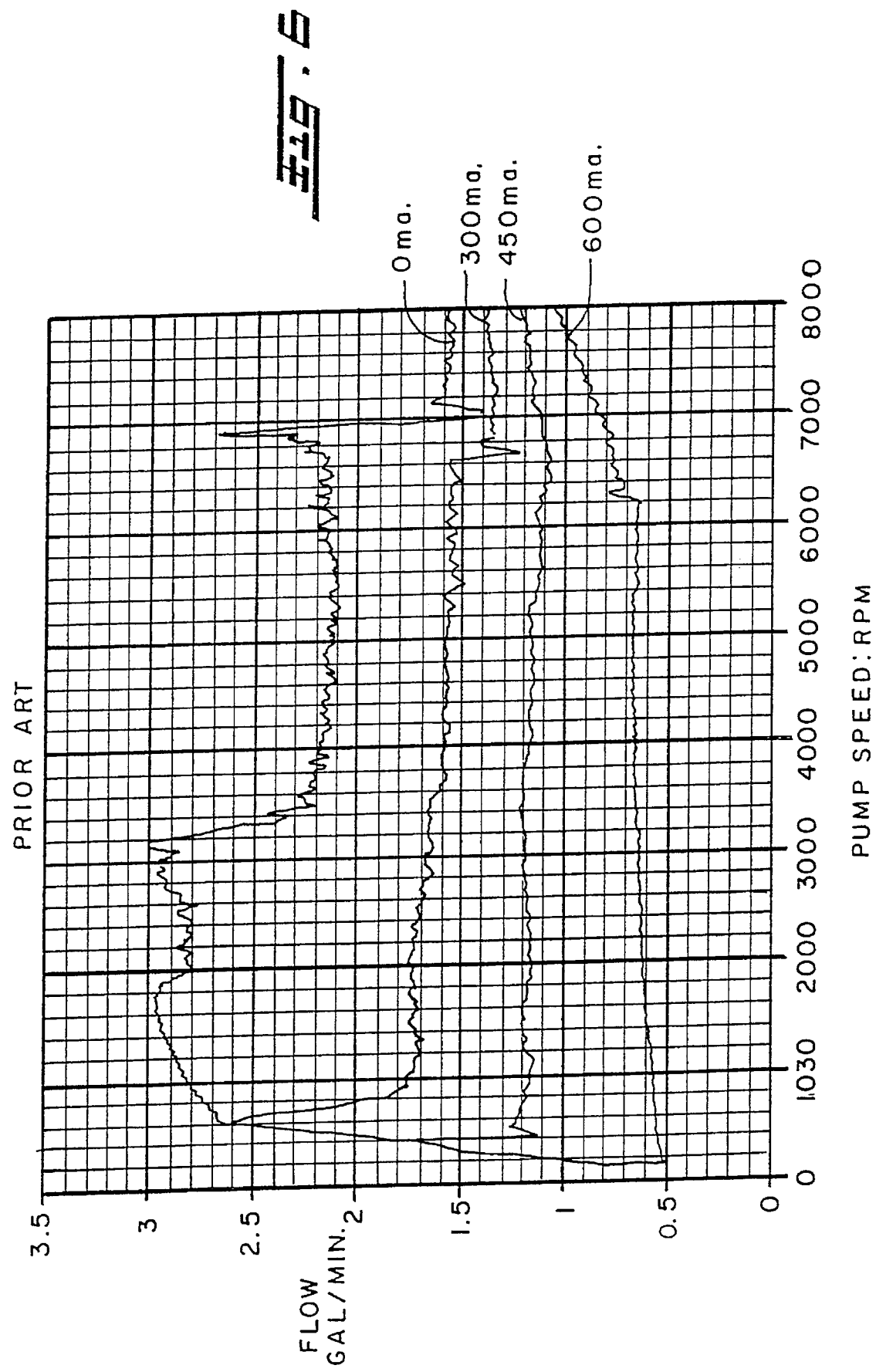

Referring to FIG. 4, graphical plots of flow as a function of pump speed are presented for the valve of the present invention for different levels of energization of the valve solenoid coil namely 0, 300, 400 and 600 milliamperes current. It will be seen from FIG. 4 that the flow response of the present invention is markedly more constant for a given coil current as compared to the flow characteristics of the prior art valve shown in FIG. 6.

Although the present invention has been described hereinabove with respect to the illustrated embodiments, it will be understood that the invention is capable of modification and variation and is limited only by the scope of the following claims.

We claim:

1. An electrically operated flow control valve comprising:
   (a) body means defining a blind valving passage open to an inlet with a plurality of outlet ports therein;
   (b) valve spool means disposed for movement in said valving passage with an end exposed to said inlet and an opposite end blind in said passage and including armature means having a relatively high magnetic permeability;
   (c) a pressure equalizing passage formed in said spool means and communicating said end exposed to said inlet with said blind end;

(d) said spool means including an annular valving land formed about the end exposed to said inlet, said land operable upon said movement of said spool means to progressively close and open said outlet ports;

(e) a bleed passage operable upon a predetermined amount of said movement of said land to communicate said pressure equalizing passage with said outlet ports; and, (f) coil means disposed on said body means and operable upon electrical energization to electromagnetically effect said movement of said armature means and spool means.

2. The valve defined in claim 1, wherein said armature means has an annular configuration.

3. The valve defined in claim 1, wherein said plurality of outlet ports includes four ports circumferentially equally spaced about said spool means.

4. The valve defined in claim 1, wherein said spool means includes a radial bore communicating with said pressure equalizing passage and intersecting an annular groove formed in said spool means, said groove progressively exposed to said outlet ports upon a predetermined movement of said spool means.

5. The valve defined in claim 1, wherein said armature means includes an annular member attached to said spool means distal said end exposed to said inlet.

6. The valve defined in claim 1, wherein said pressure equalizing passage includes an axial bore formed in said spool means and a crossport communicating therewith.

7. The valve defined in claim 1, further comprising passage means providing residual flow when said outlets are closed.

8. A method of making an electrically operated flow control valve comprising:

(a) forming an inlet bore in a valve body and porting the bore to an outlet in the body and disposing a valve spool in the bore and electromagnetically moving the spool and progressively uncovering and covering the porting with an end of the spool and controlling flow to the outlet;

(b) forming a pressure equalization passage through the spool in the direction of movement;

(c) forming a transverse bleed passage in said spool communicating with said equalization passage and locating said bleed passage a predetermined distance from said end of said spool;

(d) moving said spool and progressively covering said port with said end and closing said valve; and, (e) communicating said bleed passage with said outlet when said end has progressively covered said port a predetermined amount and bleeding fluid from said equalization passage to said outlet and compensating for the pressure drop as said port is progressively covered and preventing unequal pressure forces on said valve.

9. The method defined in claim 8 wherein said step of forming a bleed passage includes forming an annular collector groove on said spool.

* * * * *